United States Patent [19]

Kurakake et al.

[11] Patent Number: 4,629,958
[45] Date of Patent: Dec. 16, 1986

[54] SYNCHRONOUS MOTOR CONTROL SYSTEM

[75] Inventors: Mitsuo Kurakake, Hino; Keiji Sakamoto, Hachiojo, both of Japan

[73] Assignee: Fanuc Ltd, Minamitsuru, Japan

[21] Appl. No.: 642,664

[22] PCT Filed: Dec. 16, 1983

[86] PCT No.: PCT/JP83/00439
§ 371 Date: Aug. 17, 1984
§ 102(e) Date: Aug. 17, 1984

[87] PCT Pub. No.: WO84/02619
PCT Pub. Date: Jul. 5, 1984

[30] Foreign Application Priority Data

Dec. 29, 1982 [JP] Japan ............................. 57-228507

[51] Int. Cl.$^4$ .................................................. H02P 5/40
[52] U.S. Cl. ...................................... 318/723; 318/722
[58] Field of Search ......................... 318/811, 721–723

[56] References Cited

U.S. PATENT DOCUMENTS 4,358,722 11/1982 Iwakane et al. .................... 318/661
4,384,244 5/1983 Matsumoto ......................... 318/811
4,456,868 6/1984 Yamamura et al. ................ 318/809

Primary Examiner—David Smith, Jr.
Attorney, Agent, or Firm—Staas & Halsey

[57] ABSTRACT

A synchronous motor control system includes a sensor (112) for sensing the rotational angle of a synchronous motor (101), and a control circuit (108) for generating a sinusoidal value corresponding to the rotational angle sensed by the sensor (112) and for multiplying the sinusoidal value by an effective value current command. The multiplied output of the control circuit (108) is applied as a current command value to the armature winding of the synchronous motor (101). In this case, the arrangement is such that the control circuit (108) compensates the sensed rotational angle by the actual velocity of the synchronous motor (101) or by a rotational command velocity for the synchronous motor.

4 Claims, 3 Drawing Figures

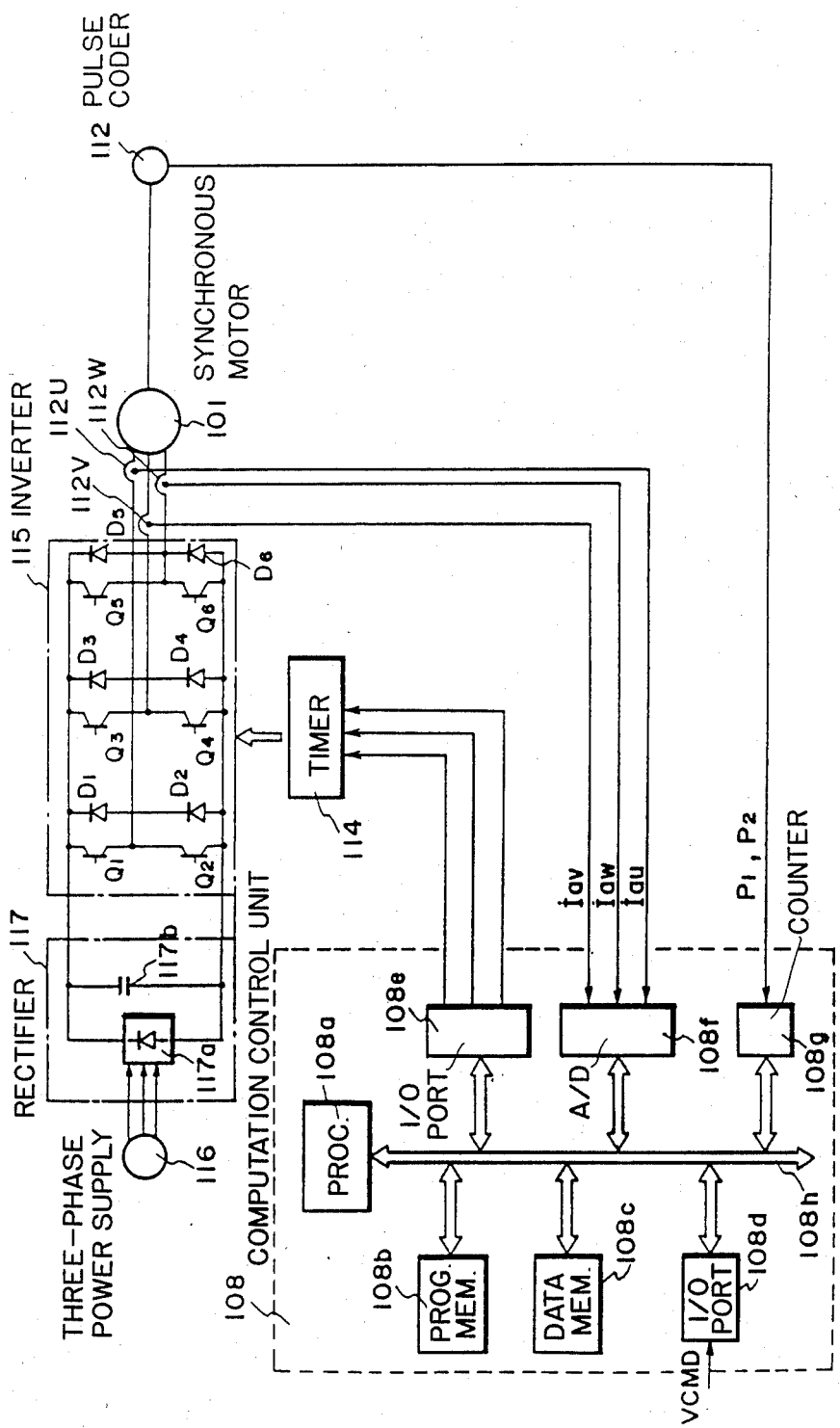

SYNCHRONOUS MOTOR CONTROL SYSTEM

CROSS-REFERENCE TO RELATED APPLICATION

This application is related to our copending U.S. application Ser. No. 637,220 filed July 23, 1984.

BACKGROUND OF THE INVENTION

This invention relates to a synchronous motor control system for controlling a synchronous motor in such a manner that the torque thereof is held constant. More particularly, the invention relates to a synchronous motor control system capable of reducing a follow-up delay in the current flowing through each of the windings of the synchronous motor.

Servomotors are employed widely in a variety of fields, and even AC servomotors have been developed in recent years. Synchronous motors also can be utilized as servomotors. In particular, since synchronous motors which use a permanent magnet as the rotor, are of the brushless type, they are simple in construction and do not generate noise. For these reasons, such synchronous motors are coming into ever wider use. In a synchronous motor of this kind, it is necessary that torque be controlled so as to be constant. To this end, there has been developed a technique in which control is exercised in such a manner that a current of the same phase as an electromotive force induced by the rotor is caused to flow into the windings of the armature, which serves as the stator. This technique will now be described using the drawing of FIG. 1, which shows the construction of a synchronous motor. The magnetic flux density B at a position displaced by $\theta$ degrees from the q axis of the magnetic field generated by a rotor 1, namely a permanent magnet, is given by the following:

$$B = B_m \sin \theta \quad (1)$$

The magnetic flux $\phi$ interlinked with the a winding of a stator 2 shown in FIG. 1 is expressed as follows:

$$\phi = -\phi_m \cos \theta_c \quad (2)$$

where $\phi_m$ represents the magnetic flux on the q axis of the rotor 1.

Accordingly, the electromotive force $e_1$ induced in the a winding is expressed as follows:

$$\begin{aligned} e_1 &= -d\phi/dt \\ &= -\phi_m \cdot p \cdot \omega_m \cdot \sin\theta \end{aligned} \quad (3)$$

(where $\theta = P\theta m = P \cdot \omega_m \cdot t$).

Likewise, the electromotive forces $e_2$, $e_3$ induced in the b and c windings of the stator 2, which are disposed at angles of $\frac{2}{3}\pi$ and $\frac{4}{3}\pi$ relative to the a winding, respectively, are expressed by the following:

$$e_2 = -\phi_m \cdot P \cdot \omega_m \cdot \sin\left(\theta - \frac{2}{3}\pi\right) \quad (4)$$

$$e_3 = -\phi_m \cdot P \cdot \omega_m \cdot \sin\left(\theta - \frac{4}{3}\pi\right) \quad (5)$$

If we let the currents flowing in the armature windings a, b, c be $i_1$, $i_2$, $i_3$, respectively, then the output torque T of such a three-phase synchronous motor will be expressed by the following:

$$T \frac{1}{2}(e_1 \cdot i_1 + e_2 \cdot i_2 + e_3 \cdot i_3) \quad (6)$$

Therefore, substituting Eqs. (3), (4) and (5) into Eq. (6), we have:

$$T = -\frac{1}{2} \phi_m \cdot P \cdot \omega_m \left\{ i_1 \cdot \sin\theta + i_2 \cdot \sin\left(\theta - \frac{2}{3}\pi\right) + i_3 \cdot \sin\left(\theta - \frac{4}{3}\pi\right) \right\} \quad (7)$$

To render the torque T constant, it should be so arranged that T is independent of the angle $\theta$. Therefore, if the following relations hold, namely:

$$\left. \begin{aligned} i_1 &= I\sin\theta \\ i_2 &= I\sin\left(\theta - \frac{2}{3}\pi\right) \\ i_3 &= I\sin\left(\theta - \frac{4}{3}\pi\right) \end{aligned} \right\} \quad (8)$$

where I is the current amplitude, then the torque T of Eq. (7) may be written as follows:

$$T = \frac{1}{2} K \left\{ I\sin^2\theta + I\sin^2\left(\theta - \frac{2}{3}\pi\right) + I\sin^2\left(\theta - \frac{4}{3}\pi\right) \right\} = \frac{3}{2} KI \quad (9)$$

Thus, the torque T is constant, being independent of the rotational orientation of the rotor 1.

To carry out such control, it is necessary to detect the rotor angle of the synchronous motor and regulate each of the armature current values in accordance therewith.

However, if the current flowing through each armature winding is delayed by $\phi_o$ from the ideal value, then the currents $i_1$, $i_2$, $i_3$ of the respective armature windings will take on the form:

$$i_1 = I\sin(\theta - \phi_o)$$

$$i_2 = I\sin\left(\theta - \frac{2}{3}\pi - \phi_o\right)$$

$$i_3 = I\sin\left(\theta - \frac{4}{3}\pi - \phi_o\right)$$

In consequence, the output torque T will be take on the form:

$$T = \frac{3}{2} KI\sin\left(\frac{\pi}{2} + \phi_o\right)$$

Thus, the torque will decrease in value.

In the control circuit of a synchronous motor, the gain of a current control loop is finite and cannot be made infinitely large. A delay in response is, therefore, inevitable. Consequently, even though a rotary encoder for sensing the rotational angle of the synchronous motor may produce an output which is an accurate indication of the rotational angle, the current in the armature winding is delayed from the ideal value. The delay, which is proportional to velocity, becomes large in magnitude.

SUMMARY OF THE INVENTION

It is an object of the present invention to provide a synchronous motor control system capable of readily reducing the above-mentioned current follow-up delay.

In a motor control system provided with a sensor for sensing the rotational angle of a synchronous motor, and a control circuit for generating a sinusoidal value corresponding to the sensed rotational angle from the sensor, and for multiplying the sinusoidal value by an effective value current command, the multiplied output of the control circuit being applied as a current command value to the armature winding of a synchronous motor, the arrangement is such that the multiplied output of the control circuit compensates the sensed rotational angle by the rotational velocity of the synchronous motor or by a rotational command velocity for the synchronous motor. According to the present invention, the follow-up delay from the ideal current for driving the synchronous motor can be diminished, and the decline in torque can be minimized.

BRIEF DESCRIPTION OF THE DRAWINGS

FIG. 3 is a block diagram of an embodiment of the present invention.

DESCRIPTION OF THE PREFERRED EMBODIMENT

The present invention will now be described in detail based on an embodiment thereof.

Figure 1:
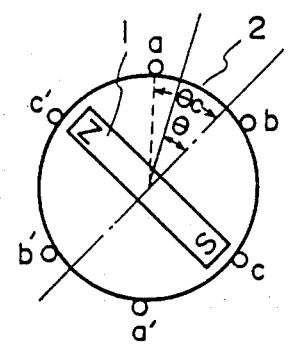
FIG. 1 is diagram of the construction of a synchronous motor to which the present invention is applied.
Figure 2:
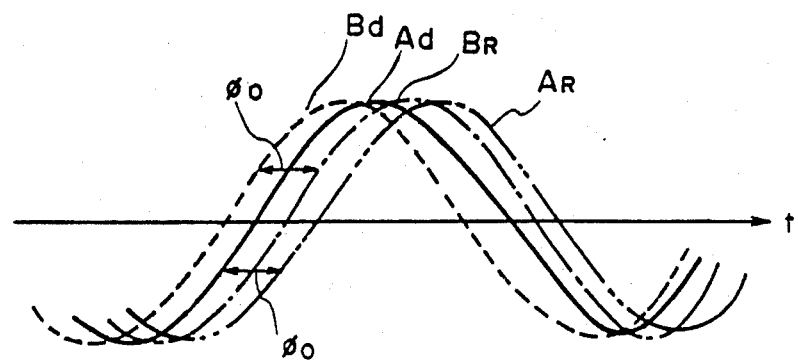
FIG. 2 is a waveform diagram for describing the principle of the present invention.

FIG. 2 is a waveform diagram for describing the principle of the present invention. In FIG. 2, Ad denotes an ideal current waveform, which is identical in terms of phase with the induced electromotive force of a synchronous motor 101, (FIG. 3) and which corresponds to the rotational angle of the synchronous motor 101. The ideal current waveform Ad corresponds to a sensed rotational angle $\theta$ of the synchronous motor 101. When a current command produced accordingly is applied to the synchronous motor 101, the actual current waveform is delayed by $\phi_o$ resulting in a waveform $A_R$. In other words, the phase is delayed by $\phi_o$. According to the present invention, the sensed rotational angle $\theta$ is compensated by being advanced in the following manner:

$$\theta' = \theta + V_a \times \Delta T \quad (10)$$

More specifically, the rotational angle is compensated by being advanced in proportion to actual velocity $V_a$. Note that $\Delta T$ represents a constant which is determined based on the value of the delay $\phi_o$, but which generally is selected to have the following value:

$$\Delta T < \phi_o / V_a \quad (11)$$

Therefore, a current command according to the present invention has a waveform advanced by $V_a \cdot \Delta T$ relative to the ideal current Ad, as shown by Bd in FIG. 2.

As a result, an actual current $B_R$ applied to the synchronous motor 101 also has a waveform advanced by $V_a \cdot \Delta T$ from the conventional actual current $A_R$, so that the delay from the ideal current $A_d$ takes on the following form and, hence, is diminished:

$$\phi_o - V_a \cdot \Delta T$$

Accordingly, the decline in torque diminishes, so that the synchronous motor can be driven in stable fashion. Moreover, since compensation is performed depending upon the rotational velocity, the decline in torque will not take on a large value even at high velocities.

Another method of compensation is to use a command velocity $V_c$ and effect the compensation as follows:

$$\theta' = \theta + V_c \times \Delta T \quad (12)$$

FIG. 3 is a block diagram illustrating an embodiment of the present invention, in which numeral 101 denotes a synchronous motor, and numeral 108 designates a computation control unit which performs the functions of a velocity control loop and current loop by means of arithmetic operations. The computation control unit 108 is composed of a processor 108a for performing arithmetic operations in accordance with a motor control program; a program memory 108b for storing the motor control program; a data memory 108c for storing data; an input/output port 108d for receiving commands from an external unit such as an NC unit; an input/output port 108e for delivering a pulse-width modulation command to a timer circuit; an analog-to-digital (AD) converter 108f which receives actual phase currents $I_{au}$, $I_{av}$, $I_{aw}$ from current detectors 112U, 112V, 112W, for converting the actual phase currents into digital values; a counter 108g in which a position code indicating the rotational position $\alpha$ of the field pole of the synchronous motor 101 is initially loaded from a pulse coder 112, the counter thereafter counting rotation pulses P1, P2 generated by the pulse coder 112 whenever the synchronous motor 101 rotates through a predetermined angle; and an address/data bus 108h for interconnecting the foregoing components. The computation control unit 108 can be of microcomputer construction. The pulse coder 112 generates a position code indicating the initial position of the field pole of the synchronous motor 101, as well as rotation pulses produced whenever the synchronous motor 101 rotates through a predetermined angle. Numeral 114 denotes a timer circuit for producing a pulse-width modulated signal the width whereof depends upon the pulse-width modulation command from the computation control unit 108. Numeral 115 denotes an inverter which is provided with a DC voltage by an externally provided three-phase power supply 116 and a rectifying circuit 117 for rectifying the three-phase alternating current into direct current. The inverter 115 has six power transistors $Q_1$ through $Q_6$ and six diodes $D_1$ through $D_6$. The power transistors $Q_1$ through $Q_6$ have their on/off action controlled by the pulse-width modulated signal to provide the synchronous motor 101 with a drive current.

Discussed next will be the operation of the arrangement embodied in FIG. 3 in a case where the velocity command is elevated while the synchronous motor is rotating at a certain velocity.

Since the synchronous motor 101 is rotating, the counter 108g, which is loaded with a position code immediately prior to the start of rotation of the synchronous motor 101, counts the rotation pulses P1, P2 which are generated as the synchronous motor 101 rotates. Accordingly, the count in the counter 108g indicates the rotational position of the field pole of synchronous motor 101 at all times. Since the period of the rotational pulses P1, P2 will be proportional to the velocity of the synchronous motor 101, the amount of increase in the count in the counter 108g over a prescribed time interval will correspond to the rotational velocity of the synchronous motor 101.

(1) First, to rotate the synchronous motor 101 at a desired rotational velocity $V_c$, the input/output port 108d is supplied with a velocity command VCMD from an external unit such as an NC unit. This command is transmitted to the processor 108a via the bus 108h.

(2) The processor 108a reads the value of the count in counter 108g, via the bus 108h, computes the differences between this value and that read previously, and divides the difference by a sampling interval T to compute the actual velocity $V_a$. Another method of sensing actual velocity is to provide a separate counter for measuring the period of the rotation pulses P1, P2, and have the processor 108a read the period and calculate the actual velocity $V_a$. (This is an actual velocity calculation step.)

(3) Using the velocity command $V_c$ and the actual velocity $V_a$, the processor 108a obtains an amplitude command Is by performing an operation given by the following equation:

$$I_s = K_1(V_c - V_a) + K_2 \sum_{i=1}^{k-1} (V_c - V_a) \quad (13)$$

The result $I_s$ in Eq. (13) corresponds to the amplitude of the armature current. When $I_s$ takes on a large value, a large torque is generated, whereby the actual velocity of the synchronous motor is brought into conformity with the commanded velocity. (This is a velocity loop computation step.)

(4) Next, the processor 108a reads the counted value $\theta$ in counter 108g via the bus 108h. Then, using the actual velocity $V_a$ obtained in the actual velocity computation step, as well as the constant $\Delta T$ stored beforehand in the data memory 108c, the processor executes the operation of Eq. (10) to find the rotational angle $\theta'$. (This is a rotational angle compensation step.)

(5) The processor 108a retrieves a counted value $\theta - \sin \theta$, $\sin(\theta - 2\pi 3)$ from a conversion table stored in the data memory 108c, and obtains digital values for $\sin \theta$, $\sin(\theta - 2\pi/3)$ corresponding to the rotational angle $\theta'$.

(6) The processor 108a multiplies the amplitude command $I_s$, which was obtained in the velocity loop computation step (3), by the digital values of $\sin \theta$, $\sin(\theta - 2\pi/3)$ to obtain two-phase current commands $I_a$, $I_b$:

$$\left. \begin{array}{l} I_a = I_s \cdot \sin\theta \\ I_b = I_s \cdot \sin(\theta + 2\pi/3) \end{array} \right\} \quad (14)$$

(7) Next, the processor 108a obtains a current command $I_c$, in accordance with the following equation, from the two-phase current commands $I_a$, $I_b$:

$$\begin{aligned} I_c &= -I_a - I_b \\ &= I_s \cdot \sin(\theta - 4\pi/3) \end{aligned} \quad (15)$$

(8) Next, the processor 108a reads, via the bus 108h, the actual currents obtained by a digital conversion applied by the AD converter 108f to the actual phase currents $I_{av}$, $I_{aw}$, $I_{au}$ obtained from the current detectors 112U, 112V, 112W, respectively. The processor 108a computes errors between the three phase current command $I_a$, $I_b$, $I_c$ and the actual phase currents $I_{av}$, $I_{aw}$, $I_{au}$, and multiplies the errors by a predetermined coefficient of amplification to obtain digital three-phase AC signals $i_u$, $i_v$, $i_w$. (The foregoing is a current loop computation step.)

(9) Next, the processor 108a multiplies the actual velocity Va, which was obtained in the foregoing velocity loop computation step, by the coefficient kf, obtains a velocity compensation output $V_{co}$, and subtracts this from the three-phase AC signals $i_u$, $i_v$, $i_w$, thereby obtaining compensated command signals $i_u$, $i_v$, $i_w$. Thus, the current loop is prevented from experiencing a drop in gain caused by a back electromotive force ascribable to the actual velocity $V_a$ of the synchronous motor 101.

(10) The processor 108a forms pulse-width modulation commands $t_u$, $t_v$, $t_w$ from the values of the three-phase AC signals $i_u$, $i_v$, $i_w$. That is, the processor computes pulse-width modulation commands $t_u$, $t_v$, $t_w$ indicative of pulse-width values conforming to the values of the three-phase AC signals $i_u$, $i_v$, $i_w$.

(11) The processor 108a delivers these commands $t_u$, $t_v$, $t_w$ to the timer circuit 11 via the bus 108h and input/output port 108e. The timer circuit 114 produces pulse-width modulated signals of a predetermined duration from the commands $t_u$, $t_v$, $t_w$ and delivers these signals to the transistors $Q_1$ through $Q_6$ of the inverter 115 to supply the synchronous motor 101 with three-phase current.

The processor 108a controls the synchronous motor 101 by executing the above-described computations in accordance with the control program in the program memory 108b at the sampling periods T, whereby the synchronous motor 101 is eventually rotated at the commanded velocity.

According to the foregoing description, the compensated rotational angle $\theta'$ is obtained by the rotational angle compensating step. However, it is permissible to replace the digital values of $\sin \theta$, $\sin(\theta - 2\pi/3)$ corresponding to the counted value $\theta$, which digital values form the contents of the counted value $\theta - \sin \theta$, $\sin(\theta - 2\pi/3)$ from the conversion table in the data memory 108c, with $\sin \theta'$, $\sin(\theta' - 2\pi/3)$.

According to the present invention as described above, in obtaining a sinusoidal signal of an identical phase necessary for driving a synchronous motor, a rotational angle from a sensor for sensing the rotational angle of the synchronous motor, is compensated by being advanced upon taking the characteristic delay of a feedback loop into consideration. The advantage obtained is a reduction in follow-up delay from an ideal current for driving the synchronous motor. A decline in torque can also be diminished. In addition, since the advancing compensation is performed by using the actual rotational velocity of the synchronous motor or by the commanded velocity, there is no large-scale decrease in torque even when velocity becomes large in magnitude. Accordingly, a decrease in torque at high velocities can be prevented. Further, since the foregoing is achieved merely by using advancing compensation, the invention can be realized simply and easily. The invention therefore exhibits important practical advantages.

It should be noted that while the present invention has been described in accordance with an embodiment thereof, the present invention is not limited to the above-described embodiment but can be modified in various ways in accordance with the gist thereof, and that such modifications will not depart from the scope of the claim.

INDUSTRIAL APPLICABILITY

According to the present invention, it is possible to diminish a follow-up delay in the current flowing through each of the windings of a synchronous motor. The invention is well-suited for application to a system wherein a synchronous motor, utilized as a servomotor, is controlled to hold the torque thereof constant.

We claim:

1. A synchronous motor control system for controlling a synchronous motor, comprising:
   a sensor for sensing a rotational angle of the synchronous motor and for generating a position signal;
   sinusoidal value generating means, coupled to said sensor, for generating a sinusoidal value corresponding to the position signal;
   computing control means, coupled to said sinusoidal value generating means, for multiplying an effective value current command by the sinusoidal value generated by said sinusoidal value generating means to produce three-phase current commands, for obtaining actual phase currents for the synchronous motor, and for computing digital three-phase AC signals based on the actual phase currents and the three-phase current commands; and
   synchronous motor drive means, coupled to said computing control means, for applying the digital three-phase AC signals to an armature winding of the synchronous motor as a current command value, said computing control means determining the actual velocity of the synchronous motor based on the position signal, and compensating the sensed rotational angle of the synchronous motor by advancing the rotational angle in proportion to the actual velocity of the synchronous motor, so that the sinusoidal value generated by said sinusoidal value generating means corresponds to the advanced rotational angle.

2. A synchronous motor control system according to claim 1, wherein said sinusoidal value generating means and said computing control means are formed by a microcomputer.

3. A synchronous motor control system for controlling a synchronous motor, connected to receive a rotational command velocity, comprising:
   a sensor for sensing a rotational angle of the synchronous motor and for generating a position signal;
   sinusoidal value generating means, coupled to said sensor, for generating a sinusoidal value corresponding to the position signal;
   computing control means, coupled to said sinusoidal value generating means, for multiplying an effective value current command by the sinusoidal value generated by said sinusoidal value generating means to produce three-phase current commands, for obtaining actual phase currents for the synchronous motor, and for computing digital three-phase AC signals based on the actual phase currents and the three-phase current commands; and
   synchronous motor drive means, coupled to said computing control means, for applying the digital three-phase AC signals to an armature winding of the synchronous motor as a current command value, said computing control means compensating the sensed rotational angle by the rotational command velocity for said synchronous motor, so that the sinusoidal value generated by said sinusoidal value generating means corresponds to the compensated rotational angle.

4. A synchronous motor control system according to claim 3, characterized in that said sinusoidal value generating means and said computing control means are constituted by a microcomputer.

* * * * *